US011934875B2

(12) United States Patent
Dawkins et al.

(10) Patent No.: US 11,934,875 B2
(45) Date of Patent: Mar. 19, 2024

(54) METHOD AND SYSTEM FOR MAINTAINING COMPOSED SYSTEMS

(71) Applicant: Dell Products L.P., Hopkinton, MA (US)

(72) Inventors: William Price Dawkins, Lakeway, TX (US); Jon Robert Hass, Austin, TX (US); Valerie Diane Padilla, Austin, TX (US); Sudhir Vittal Shetty, Cedar Park, TX (US); James Robert King, Norwood, MA (US); Justin A Kenney, Upton, MA (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 17/117,047

(22) Filed: Dec. 9, 2020

(65) Prior Publication Data

US 2022/0179702 A1 Jun. 9, 2022

(51) Int. Cl.
*G06F 9/50* (2006.01)
*G06F 11/34* (2006.01)

(52) U.S. Cl.
CPC ........ *G06F 9/5011* (2013.01); *G06F 11/3433* (2013.01)

(58) Field of Classification Search
CPC ........................... G06F 9/5011; G06F 11/3433
See application file for complete search history.

(56) References Cited

U.S. PATENT DOCUMENTS 7,478,117 B1 1/2009 Lamb et al.
7,606,892 B2 * 10/2009 Piet ..................... H04L 41/0806 709/224
7,620,984 B2 11/2009 Kallahalla
8,095,929 B1 1/2012 Ji et al.
8,245,053 B2 8/2012 Hoang et al.
8,266,636 B2 9/2012 Kharat et al.
8,276,140 B1 9/2012 Beda, III et al.

(Continued)

FOREIGN PATENT DOCUMENTS

WO 2005071552 A1 8/2005
WO 2007120772 A2 10/2007

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

(Continued)

*Primary Examiner* — Jorge A Chu Joy-Davila

(74) *Attorney, Agent, or Firm* — Chamberlain, Hrdlicka, White, Williams & Aughtry; Aly Z. Dossa

(57) ABSTRACT

An information handling system for composing composed information handling systems includes persistent storage and a system control processor. The system control processor, after being allocated to a composed information handling system of the composed information handling systems: monitors health of computing resources of the composed information handling system; makes a determination, based on the monitoring of the health of the computing resources, that at least one of the computing resources is in a compromised state; and, based on the determination, marks the at least one of the computing resources for recomposition.

14 Claims, 10 Drawing Sheets

START
Receive recomposition request for computing resources of a composed information handling system. Step 600
Initiate recomposition? Step 602
YES
Match at least a portion of the computing resources that are in a compromised state to free computing resources. Step 604
Deallocate the computing resources from the composed information handling system. Step 606
Compose replacement computing resources using, at least in part, the matched free computing resources. Step 608
Allocate the replacement computing resources to the composed information handling system. Step 610
Send response to composition request. Step 612
NO
Delay the recomposition. Step 614
Send response to composition request. Step 616
END

(56) References Cited

U.S. PATENT DOCUMENTS 8,285,747 B1 10/2012 English
8,306,948 B2 11/2012 Chou
8,499,066 B1 7/2013 Zhang et al.
8,589,659 B1 11/2013 Shapiro
8,606,920 B1 12/2013 Gupta et al.
8,751,546 B1 6/2014 Grieve
8,997,242 B2 3/2015 Chen
9,104,844 B2 8/2015 Fang
9,105,178 B2 8/2015 Carlson
9,245,096 B2 1/2016 Abuelsaad
9,413,819 B1 8/2016 Berg et al.
9,529,689 B2 12/2016 Ferris et al.
9,569,266 B2 2/2017 Chen et al.
9,569,598 B2 2/2017 Abuelsaad
9,600,553 B1 3/2017 Nigade et al.
9,613,147 B2 4/2017 Carlson
9,678,977 B1 6/2017 Aronovich
9,806,979 B1 10/2017 Felstaine et al.
9,898,316 B1 2/2018 Chalmer et al.
9,916,200 B2 3/2018 Xu
9,923,785 B1 3/2018 Li et al.
9,959,140 B2 5/2018 Jackson
10,097,438 B2 10/2018 Ferris et al.
10,348,574 B2 7/2019 Kulkarni
10,382,279 B2 8/2019 Roese
10,601,903 B2 3/2020 Bivens
10,628,225 B2 4/2020 Yamato
10,754,741 B1 8/2020 Sethuramalingam et al.
10,756,990 B1 8/2020 Chakkassery Vidyadharan et al.
10,782,882 B1 9/2020 Wu
10,795,856 B1 10/2020 Smith et al.
10,848,408 B2 11/2020 Uriel
10,860,362 B2 12/2020 Lal et al.
10,860,380 B1 12/2020 Kowalski et al.
10,909,072 B2 2/2021 Sun et al.
10,909,283 B1 2/2021 Wang et al.
10,994,198 B1 5/2021 Byskal et al.
11,119,739 B1 9/2021 Allen et al.
11,133,030 B1 9/2021 Shen et al.
11,134,013 B1 9/2021 Allen et al.
11,221,886 B2 1/2022 Bivens et al.
11,288,056 B1 3/2022 Shetty et al.
11,288,102 B2 3/2022 Hamilton et al.
11,308,234 B1 4/2022 Stapleton
11,397,739 B2 7/2022 Pfitzmann et al.
11,537,421 B1* 12/2022 Brooker ................ H04L 9/0894
11,616,686 B1 3/2023 Chandrachood et al.
2002/0188711 A1 12/2002 Meyer et al.
2003/0028642 A1 2/2003 Agarwal et al.
2003/0061262 A1 3/2003 Hahn et al.
2003/0233427 A1 12/2003 Taguchi
2004/0257998 A1 12/2004 Chu et al.
2006/0082222 A1 4/2006 Pincu et al.
2006/0089951 A1 4/2006 Factor et al.
2006/0161884 A1 7/2006 Lubrecht et al.
2006/0230407 A1 10/2006 Rosu et al.
2006/0236100 A1 10/2006 Baskaran et al.
2008/0052480 A1 2/2008 Satoyama et al.
2008/0313476 A1 12/2008 Hansen
2009/0199193 A1* 8/2009 Jackson ................ G06F 9/5077 718/104
2009/0282404 A1 11/2009 Khandekar et al.
2010/0138656 A1 6/2010 Chinen et al.
2010/0217865 A1 8/2010 Ferris
2011/0055378 A1 3/2011 Ferris et al.
2011/0099147 A1* 4/2011 McAlister .............. G06F 16/27 707/639
2011/0154500 A1 6/2011 Sahita et al.
2011/0258248 A1 10/2011 Jackson
2011/0307570 A1 12/2011 Speks
2012/0047328 A1 2/2012 Williams et al.
2012/0066483 A1 3/2012 Boury et al.
2012/0131161 A1 5/2012 Ferris et al.
2012/0221314 A1 8/2012 Bourlatchkov et al.
2012/0222084 A1 8/2012 Beaty et al.
2013/0007710 A1* 1/2013 Vedula .................. G06F 9/5061 717/124
2013/0311434 A1 11/2013 Jones
2013/0332901 A1 12/2013 Berg et al.
2013/0346718 A1 12/2013 Meshchaninov et al.
2014/0007097 A1 1/2014 Chin et al.
2014/0149635 A1 5/2014 Bacher et al.
2014/0165063 A1 6/2014 Shiva et al.
2014/0223233 A1 8/2014 Heyrman et al.
2014/0279884 A1 9/2014 Dantkale et al.
2014/0282820 A1 9/2014 Walton et al.
2014/0358972 A1 12/2014 Guarrieri et al.
2014/0359356 A1 12/2014 Aoki
2015/0085868 A1 3/2015 Snyder, II et al.
2015/0106165 A1 4/2015 Rai et al.
2015/0121394 A1 4/2015 Chen et al.
2015/0178128 A1 6/2015 Knowles et al.
2015/0220455 A1 8/2015 Chen et al.
2015/0281336 A1 10/2015 Beale
2015/0317173 A1 11/2015 Anglin
2015/0381426 A1 12/2015 Roese et al.
2016/0062441 A1 3/2016 Chou et al.
2016/0103698 A1 4/2016 Yang et al.
2016/0180087 A1 6/2016 Edwards et al.
2016/0224903 A1 8/2016 Talathi et al.
2016/0259665 A1 9/2016 Gaurav et al.
2017/0031622 A1 2/2017 Nagarajan et al.
2017/0034012 A1 2/2017 Douglas et al.
2017/0041184 A1 2/2017 Broz et al.
2017/0048200 A1 2/2017 Chastain
2017/0097851 A1 4/2017 Chen
2017/0118247 A1 4/2017 Hussain
2017/0195201 A1* 7/2017 Mueller ............. H04L 41/0659
2017/0201574 A1 7/2017 Luo
2017/0295107 A1 10/2017 Salapura et al.
2018/0024964 A1 1/2018 Mao
2018/0026905 A1 1/2018 Balle et al.
2018/0027067 A1 1/2018 Guim Bernat et al.
2018/0063145 A1 3/2018 Cayton et al.
2018/0074816 A1 3/2018 Moss et al.
2018/0157429 A1 6/2018 Venkat et al.
2018/0157444 A1 6/2018 Franciosi et al.
2018/0246749 A1 8/2018 Van Riel et al.
2018/0351836 A1 12/2018 Guim Bernat et al.
2019/0014193 A1 1/2019 Guim Bernat et al.
2019/0065061 A1 2/2019 Kim et al.
2019/0065256 A1 2/2019 Hamilton et al.
2019/0079837 A1 3/2019 Agarwal et al.
2019/0164087 A1 5/2019 Ghibril et al.
2019/0188014 A1 6/2019 Easterling et al.
2019/0190778 A1 6/2019 Easterling et al.
2019/0205180 A1* 7/2019 Macha .................. G06F 11/203
2019/0227616 A1 7/2019 Jenne et al.
2019/0281373 A1 9/2019 Sadasivarao et al.
2019/0324808 A1 10/2019 Krishnan et al.
2019/0334774 A1 10/2019 Bennett et al.
2019/0356729 A1 11/2019 Bivens et al.
2019/0356731 A1 11/2019 Bivens et al.
2019/0384516 A1 12/2019 Bernat
2019/0384648 A1 12/2019 Wiggers et al.
2019/0386902 A1 12/2019 Mueller et al.
2020/0026564 A1 1/2020 Bahramshahry et al.
2020/0028854 A1 1/2020 Fabrizi et al.
2020/0034221 A1 1/2020 Ganesan et al.
2020/0034528 A1 1/2020 Yang et al.
2020/0044966 A1 2/2020 Krishnan et al.
2020/0045116 A1* 2/2020 Deodhar ................. H04L 41/40
2020/0065254 A1 2/2020 Cao et al.
2020/0097358 A1 3/2020 Mahindru et al.
2020/0110639 A1 4/2020 Corsi et al.
2020/0174949 A1 6/2020 Ramasamy et al.
2020/0218561 A1 7/2020 Lal et al.
2020/0233582 A1 7/2020 Chen et al.
2020/0241798 A1 7/2020 Kanno
2020/0264998 A1 8/2020 Long et al.
2020/0285502 A1 9/2020 Hildebrand et al.
2020/0293375 A1 9/2020 Klein
2020/0341786 A1 10/2020 Soryal
2020/0341798 A1 10/2020 Duleba

(56) References Cited

U.S. PATENT DOCUMENTS

| | | | |
|---|---|---|---|
| 2020/0351221 | A1 | 11/2020 | Subramani et al. |
| 2020/0351347 | A1 | 11/2020 | Chang et al. |
| 2020/0356200 | A1 | 11/2020 | Blanco et al. |
| 2020/0358714 | A1 | 11/2020 | Singleton, IV et al. |
| 2020/0364001 | A1 | 11/2020 | Bhandari et al. |
| 2020/0401457 | A1 | 12/2020 | Singhal et al. |
| 2021/0019062 | A1 | 1/2021 | Fessel |
| 2021/0019162 | A1 | 1/2021 | Viswanathan et al. |
| 2021/0037466 | A1 | 2/2021 | Silva et al. |
| 2021/0111942 | A1* | 4/2021 | Tahhan ............... H04L 41/0695 |
| 2021/0117389 | A1 | 4/2021 | Cui et al. |
| 2021/0117441 | A1 | 4/2021 | Patel et al. |
| 2021/0152659 | A1 | 5/2021 | Cai et al. |
| 2021/0185565 | A1 | 6/2021 | Kalderen et al. |
| 2021/0224093 | A1* | 7/2021 | Fu ......................... G06F 9/4406 |
| 2021/0233532 | A1* | 7/2021 | Kudurshian .......... G06F 16/951 |
| 2021/0250220 | A1 | 8/2021 | Yang et al. |
| 2021/0286667 | A1 | 9/2021 | Yigzaw et al. |
| 2021/0367901 | A1 | 11/2021 | Singh et al. |
| 2021/0383020 | A1 | 12/2021 | Sofia et al. |
| 2021/0397494 | A1 | 12/2021 | Graham |
| 2022/0179701 | A1 | 6/2022 | Saad et al. |
| 2022/0182288 | A1* | 6/2022 | Vaikar ................ H04L 41/5045 |
| 2022/0191253 | A1 | 6/2022 | Rungta et al. |
| 2022/0197773 | A1 | 6/2022 | Butler et al. |
| 2022/0342649 | A1 | 10/2022 | Cao et al. |
| 2023/0026690 | A1 | 1/2023 | Dawkins et al. |
| 2023/0033296 | A1 | 2/2023 | Shetty et al. |
| 2023/0093900 | A1 | 3/2023 | Scope et al. |
| 2023/0237204 | A1 | 7/2023 | Khatri et al. |

OTHER PUBLICATIONS

International Searching Authority, International Search Report and Written Opinion dated Oct. 21, 2021 for corresponding PCT Application No. PCTUS2021029708 filed Apr. 28, 2021.

International Searching Authority, International Search Report and Written Opinion for corresponding PCT Application No. PCTUS2021029702 filed Apr. 28, 2021, Aug. 19, 2021, 13 pages.

International Searching Authority, International Search Report and Written Opinion dated Jul. 19, 2021, Issued in corresponding PCT Application No. PCT/US2021/029687, 11 pages.

International Searching Authority, International Search Report and Written Opinion of corresponding PCT Application No. PCT/US2021/029698, dated Aug. 9, 2021, 15 pages.

Chunlin, Li et al., "Hybrid Cloud Adaptive Scheduling Strategy for Heterogeneous Workloads", Journal of Grid Computing 17, pp. 419-446, (Year: 2019) (28 pages).

International Search Report and Written Opinion of the International Searching Authority dated Oct. 21, 2021, Issued in corresponding PCT Application No. PCT/US2021/029708 (12 pages).

International Search Report and Written Opinion of the International Searching Authority dated Aug. 19, 2021, issued in corresponding PCT Application No. PCT/US2021/029702 (13 pages).

International Search Report and Written Opinion of the International Searching Authority dated Aug. 9, 2021, issued in corresponding PCT Application No. Application No. PCT/US2021/029698 (15 pages).

International Search Report and Written Opinion of the International Searching Authority dated Jul. 19, 2021, issued in corresponding PCT Application No. PCT/US2021/029687 (11 pages).

Francesco Paolucci, Andrea Sgambelluri, "Telemetry in Disaggregated Optical Networks", 2020 International Conference on Optical Network Design and Modeling (ONDM) (Year: 2020).

Marcio Barbosa De Carvalho et al., "A Cloud Monitoring Framework for Self-Configured Monitoring Slices Based on Multiple Tools", 9th CNSM and Workshops (Year: 2013), pp. 180-184.

Peter X. Gao et al., "Network Requirements for Resource Disaggregation", 12th USENIX Symposium on Operating Systems Design and Implementation (OSDI '16) (Year: 2016), pp. 249-264.

Yuxin Cheng et al., "Disaggregated Data Centers: Challenges and Tradeoffs", (Year: 2020).

Mohammadi et al, "Towards an End-to-End Architecture for Run-time Data Protection in the Cloud", 2018 44th Euromicro Conference on Software Engineering and Advanced Applications (SEAA), IEEE, pp. 514-518. (Year: 2018).

Alachiotis, Nikolaos, et al. "dReDBox: A Disaggregated Architectural Perspective for Data Centers", Hardware Accelerators in Data Centers; Springer International Publishing AG, pp. 35-56. (Year: 2019).

* cited by examiner

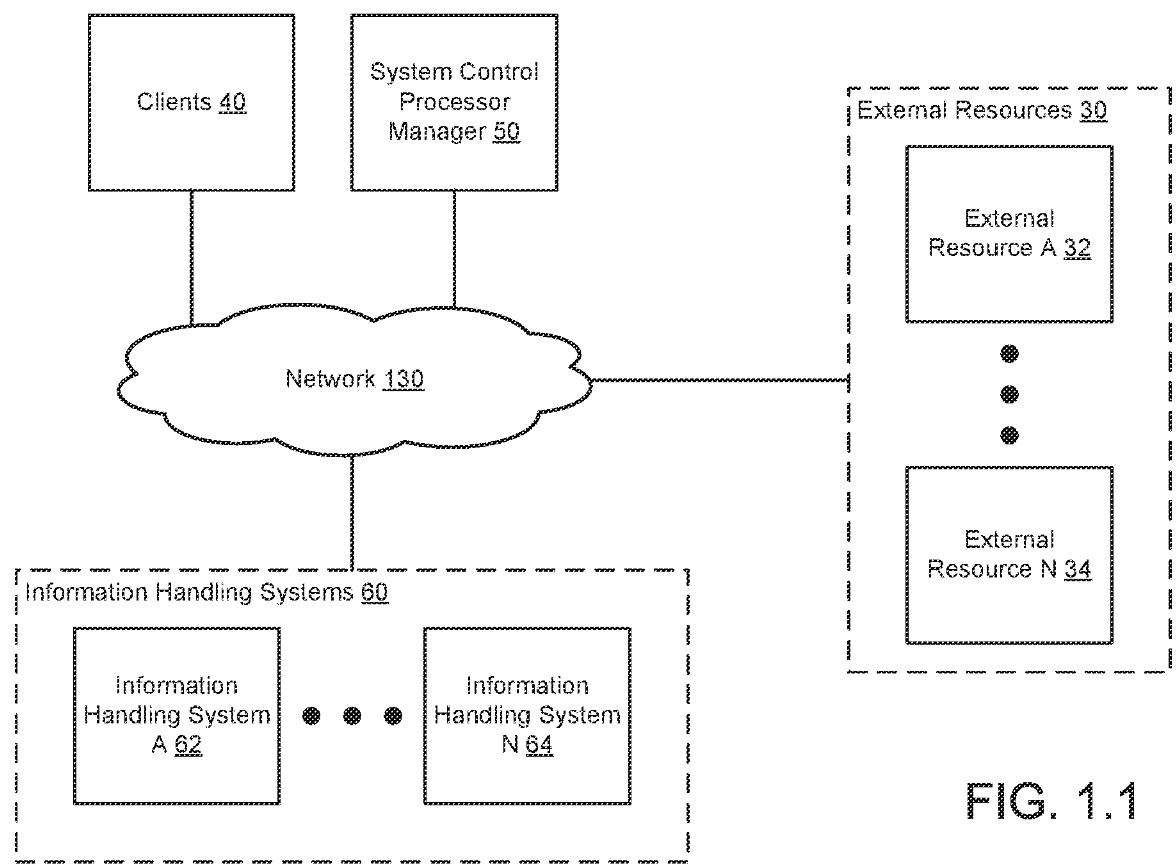
FIG. 1.1

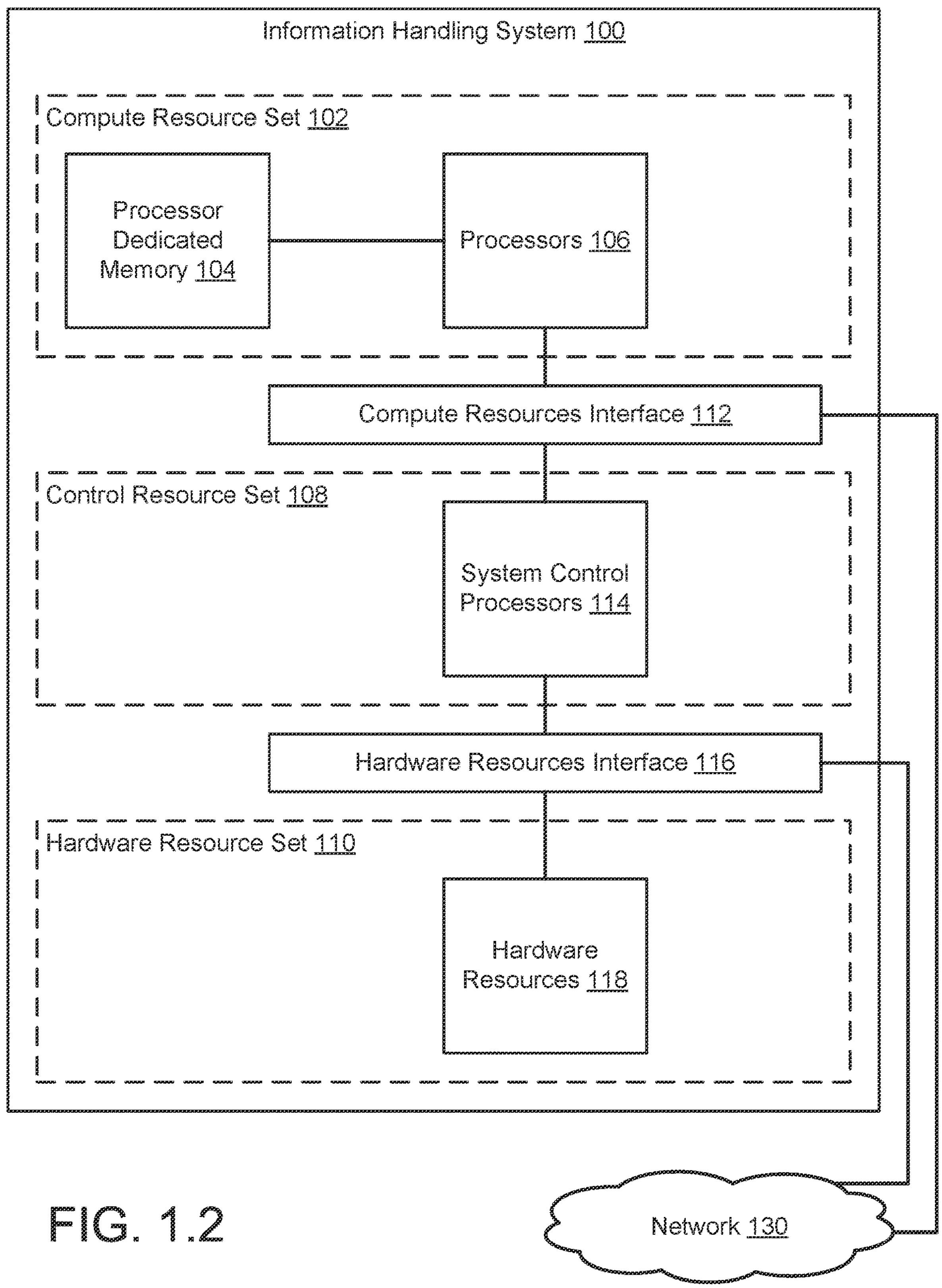
FIG. 1.2

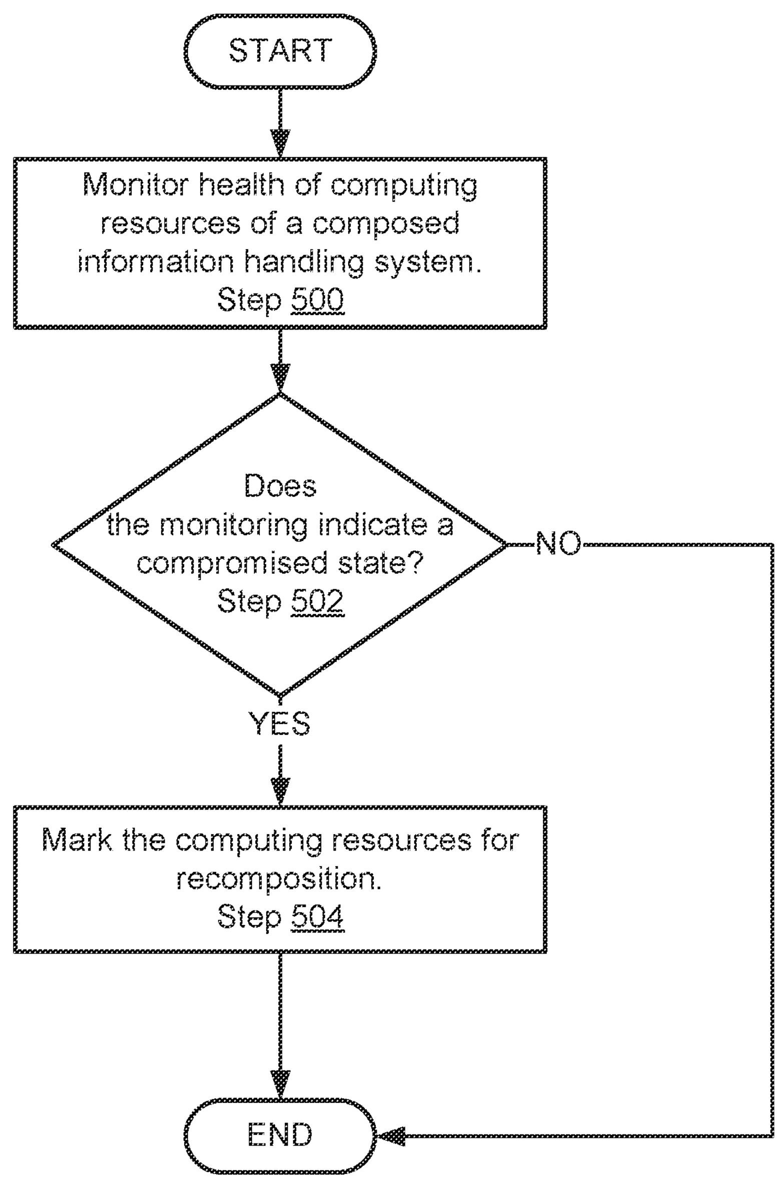
FIG. 5.1

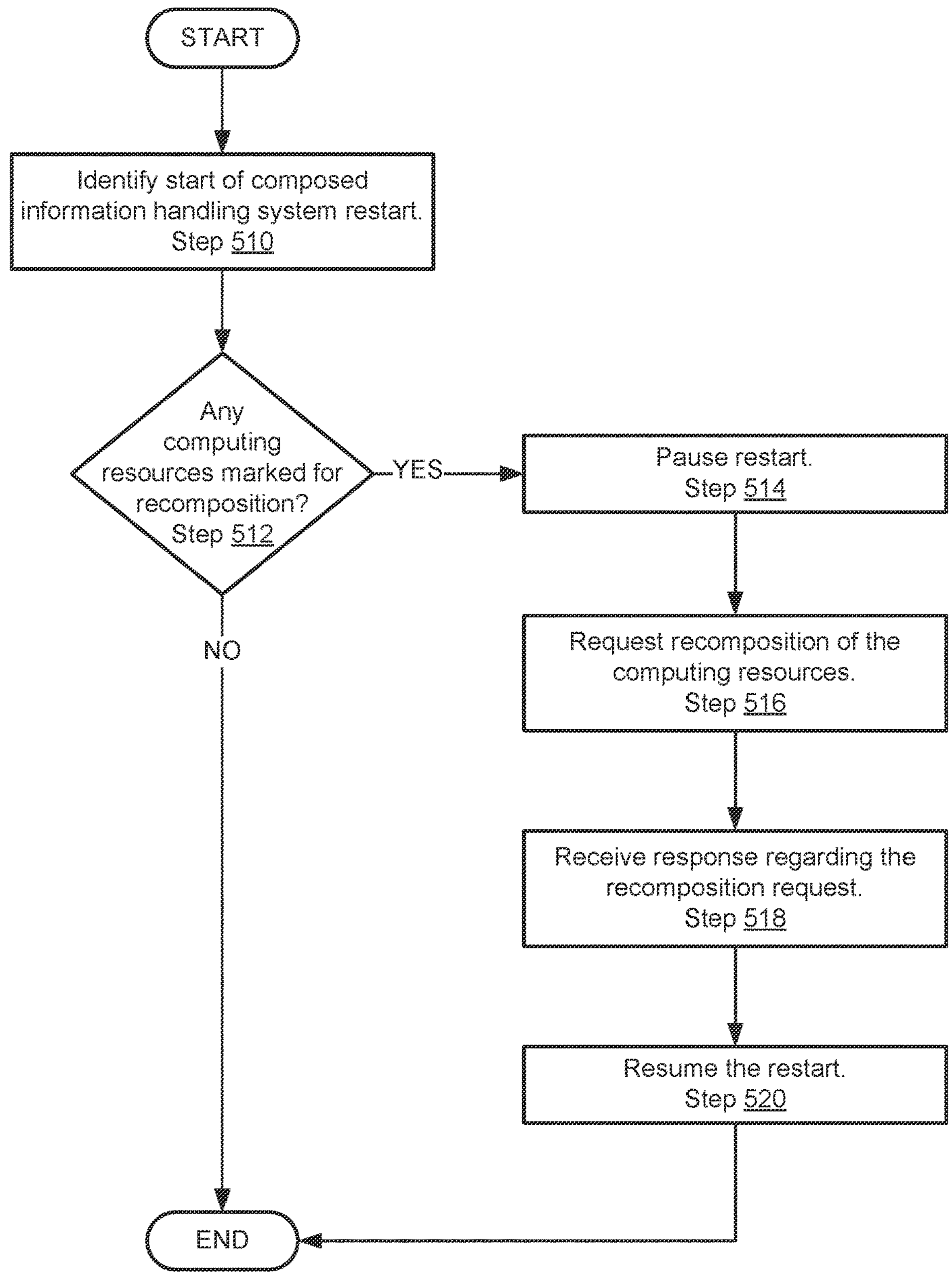
FIG. 5.2

METHOD AND SYSTEM FOR MAINTAINING COMPOSED SYSTEMS

BACKGROUND

Computing devices may provide services. To provide the services, the computing devices may include hardware components and software components. The services provided by the computing devices may be limited by these components.

SUMMARY

In one aspect, an information handling system for composing composed information handling systems in accordance with one or more embodiments of the invention includes persistent storage and a system control processor. The system control processor, after being allocated to a composed information handling system of the composed information handling systems: monitors health of computing resources of the composed information handling system; makes a determination, based on the monitoring of the health of the computing resources, that at least one of the computing resources is in a compromised state; and, based on the determination, marks the at least one of the computing resources for recomposition.

In one aspect, a method for providing computer implemented services using information handling systems in accordance with one or more embodiments of the invention includes instantiating a composed information handling system using the information handling systems; monitoring, using a system control processor of the composed information handling system, health of computing resources of the composed information handling system; making a determination, based on the monitoring of the health of the computing resources, that at least one of the computing resources is in a compromised state; and, based on the determination, marking the at least one of the computing resources for recomposition.

In one aspect, a non-transitory computer readable medium in accordance with one or more embodiments of the invention includes computer readable program code, which when executed by a computer processor enables the computer processor to perform a method for providing computer implemented services using information handling systems. The method includes stantiating a composed information handling system using the information handling systems; monitoring, using a system control processor of the composed information handling system, health of computing resources of the composed information handling system; making a determination, based on the monitoring of the health of the computing resources, that at least one of the computing resources is in a compromised state; and, based on the determination, marking the at least one of the computing resources for recomposition.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of operating a composed information handling system in accordance with one or more embodiments of the invention.

FIG. 5.2 shows a flowchart of a method of restarting a composed information handling system in accordance with one or more embodiments of the invention.

DETAILED DESCRIPTION

Figure 2:
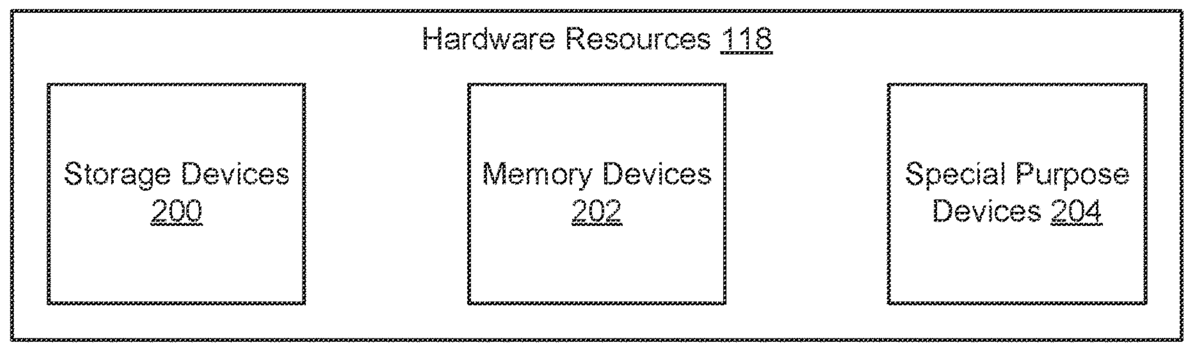
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The services may include, for example, processing resources, memory, resources, storage resources, computing resources, etc.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests and/or recomposition requests. These requests may indicate a desired outcome such as, for example, quantities of computing resources to be provided to a composed information handling system and/or modifications of existing allocations.

After a composed information handling system is instantiated, the health of computing resources of the composed information handling system may be monitored to ascertain whether the resources have been compromised. If the resources have been compromised, then the system may take action to recompose the computing resources so that different hardware devices are used to provide the computing resources. By doing so, the system may automatically and without requiring user intervention proactively address potential resource compromises that may otherwise reduce the quality of or prevent computer implemented services from being provided using the composed information handling system.

Accordingly, phantom slow downs or other performance hiccups that may degrade a quality of a user's experience of the computer implemented services may be automatically remediated. Additionally, by recomposing computing resources, composed information handling systems may not need to be overprovisioned with computing resources because compromises in those resources will be automatically remediated. Consequently, the efficiency of computing resource use may be improved by more efficiently allocating (e.g., increasing utilization rate) computing resources.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling systems of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services. Consequently, computing resources may be used inefficiently if the quantity of computing resources are over-allocated for the computer implemented services. Similarly, the quality of the provided computer implemented services may be poor or otherwise undesirable if computing resources are under-allocated for the computer implemented services.

Clients (40) may request that the computer implemented services be provided. For example, the clients (40) may send requests to management entities to have the computer implemented services be provided.

In general, embodiments of the invention relate to system, methods, and devices for managing the hardware resources of the information handling systems (60) and/or other resources (e.g., external resources (30)) to provide computer implemented services. The hardware resources of the information handling systems (60) may be managed by instantiating one or more composed information handling systems using the computing resources of the information handling systems (60), external resources (30), and/or other types of hardware devices operably connected to the information handling systems (60). Consequently, the computing resources allocated to a composed information handling system may be tailored to the specific needs of the services that will be provided by the composed information handling system.

Overtime, the quality and/or quantity of computing resources provided by various hardware devices may change. For example, overtime some of the storage cells of a solid state disk may fail thereby resulting in a reduction of the quantity of storage resources that the solid state disk may provide. In another example, a hard disk drive may fail thereby rending the hard disk drive unable to provide any storage resources. Consequently, a computing resource may be compromised (e.g., enter a compromised state) when the quantity and/or quality of computing resources that may be provided using one or more hardware devices changes.

When the quantity of computing resources able to be provided by one or more hardware devices changes, it may negatively impact the quality of computer implemented services provided using the computing resources. For example, the rate of provided services may decrease, the quantity of services that can be provided may decrease, and/or a service may no longer be able to be provided.

To provide consistent qualities of computer implemented services, the system of FIG. 1.1 may provide health management services for its components. Health management services may include taking action when computing resources enter compromised states. The actions taken may include recomposing the resources so that the computing resources may transition from the compromised state to a nominal state (e.g., a state in which the hardware devices providing the computing resources are not impaired or lack capability to provide nominal quantities of computing resources).

To provide health management services, the system may include a system control processor manager (50). The system control processor manager (50) may provide composed information handling system management services. Composed information handling system management services may include (i) obtaining composition requests for composed information handling systems from, for example, the clients (40), (ii) aggregating computing resources from the information handling systems (60) and/or external resources (30) using system control processors to service the composition requests by instantiating composed information handling systems in accordance with the requests, and (iii) modifying resource allocations for composed information handling systems to address compromised computing resources utilized by the composed information handling systems. By doing so, instantiated composed information handling systems may provide computer implemented services in accordance with the expectations of the clients and consistently overtime by automatically addressing changes in the quantity of computing resources available to the composed information handling systems.

To determine whether to modify resource allocations, the system control processor manager (50) may monitor, for example, the states of computing resources allocated to the composed information handling systems. For example, the system control processor manager may request or may otherwise obtain reports from system control processors regarding the health (e.g., compromise states) of computing resources utilized by the composed information handling systems. The system control processor manager may utilize the obtained information to determine whether (i) computing resources should be immediately recomposed or (ii) recomposition of the computing resources should be delayed to future points in time (e.g., if a compromised state of computing resources does not limit the ability of a composed information handling system to provide computer implemented services).

If the system control processor manager (50) determines, based on the monitoring, that computing resources of one or more composed information handling systems should be recomposed, then the system control processor manager (50) may (i) identify replacement computing resources for all or a portion of the hardware devices providing the computing resources in the compromised state, (ii) deallocate all or a portion of the aforementioned hardware devices, and (iii) allocate the replacement computing resources to the one or more composed information handling systems. By doing so, the computer implemented services provided by the composed information handling systems may be more likely to meet the expectations of the clients (40) by virtue of the consistent quantity of computing resources available for providing the services.

To monitor the health of the computing resources of composed information handling systems, the system control processor manager (50) may instruct system control processors of the composed information handling systems to monitor the aforementioned computing resources. For example, the system control processor manager (50) may send corresponding instructions to the system control processors via any communications scheme.

Prior to monitoring the health of the computing resources of the composed information handling systems, the system control processor manager (50) may instantiate the composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities and types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For example, entities tasked with monitoring the health of computing resources of the composed information handling systems may be deployed in control resource sets. Accordingly, the health of these computing resources for providing computer implemented services requested by the clients (40) may be uniformly monitored across the information handling systems (60). For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services. Thus, the quality of the computer implemented services may be limited based on the allocation of computing resources to the composed information handling systems.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may monitor the utilization and/or health of computing resources for providing computer implemented services requested by the clients (40), and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction such as emulation, virtualization, indirection, security model, data integrity model, etc. For example, the system control processors of the control resource sets may provide the abstraction, emulation, virtualization, indirection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. Accordingly, by utilizing system control processors to monitor the health of the computing resources of a composed information handling system, applications or other entities hosted by the composed information handling system may not be able to view, be aware, impact, or otherwise influence the collection of computing resource health data. Accordingly, relevant information that may be used to decide how to manage computing resources for health management purposes may be obtained in a manner that is transparent to the composed information handling systems. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resources to provide their functionalities. For example, system control processors may operably connect to and manage the external resources (30) to provide additional and/or different computing resources from those available to be provided only using hardware resource sets of information handling systems. By utilizing system control processors to manage these resources, the use of these external resources (30) for providing services requested by the clients (40) may also be efficiently and transparently monitored.

Different external resources (e.g., 32, 34) may provide similar or different computing resources. For example, some external resources may include large numbers of hard disk drives to provide storage resources while others may include graphics processing unit rendering farms. The external resources (30) may include any number and type of computing resources for allocation to composed information handling systems via system control processors of control resource sets.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The clients (40), system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5.1-6. The clients (40), system control processor manager (50), information handling systems (60), and/or external resources (30) may be implemented using other types of computing devices without departing from the invention. For additional details regarding computing devices, refer to FIG. 8.

While the system of FIG. 1.1 has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 20) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems, monitoring of the health of computing resources utilized by the composed information handling systems, and/or recomposition of the computing resources. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources (e.g., the compute resource set may send bare metal communications to the control resource set, the control resource set may translate those bare metal communications into prepared resource compatible communications, and the control resource set may send the prepared resource compatible communications to the hardware resource set).

The control resource set (108) may also enable the utilization of any of the hardware components of the information handling system (100) by respective clients. When a composed information handling system is instantiated, it (and its hardware devices) may be utilized by a client by enabling the client to load application onto the composed information handling system. For example, the client may cause the composed information handling system to execute applications on the compute resource set (102) which, in turn, may utilize any number of hardware resource sets (e.g., 110) as part of their execution.

Because the control resource set (108) may mediate utilization of hardware resource sets (110) by compute resource sets (102), the control resource set (108) may transparently ascertain the health of the hardware devices of these resource sets. To do so, the control resource set (108) may (i) intercept (as part of presenting computing resources of hardware resource sets to compute resource sets) communications between resource sets which may be used to infer the health of these hardware devices and explicitly monitor the health of these hardware devices by invoking health functions of these devices (e.g., health reporting functions, diagnostic functions, etc.).

The collected health information may be used, for example, to ascertain whether any of the computing resources provided by any number of hardware devices should be recomposed. In one or more embodiments of the invention, recomposing computing resources means changing all or a portion of the hardware devices used to provide the computing resources.

For example, consider a scenario where at a first point in time a control resource set is presenting storage resources to a computing resource set using a hard disk drive of a hardware resource set. If the hard disk drive fails, the control resource set may no longer be able to present the computing resources using the hard disk drive. Based on health monitoring of the hard disk drive, the control resource set may identify that the hard disk drive may be likely to fail. In response to the determination, the control resource set may request that the storage resource be recomposed. A system control processor manager may identify free storage that may be used to replace the likely to fail hard disk drive. The free storage resources may be allocated to the composed information handling system. The control resource set may migrate the data to the newly allocated free storage resources and begin presenting the new storage resources as the storage resources to the compute resource set. The likely to fail hard disk drive may then be deallocated from the composed information handling system. By doing so, storage resources may be continuously presented to the computing resource set (102) in a transparent manner even though different hardware devices have been utilized overtime to provide the storage resources.

The processors (106) of the compute resource set (102) may be operably connected to one or more system control processors (114) of the control resource set (108). For example, the processors (106) may be connected to a compute resources interface (112), which is also connected to the system control processors (114). The compute resources interface (112) may enable the processors (106) to communicate with other entities via bare metal communications. Also, the compute resources interface (112) may enable system control processors (114) of the control resource set (108) to monitor the activity and/or health of the processors (106) and/or processor dedicated memory (104) to identify use of these hardware devices by clients. For example, the compute resources interface (112) may support sideband communications to the hardware devices of the compute resource set (102) thereby enabling health information for these hardware devices to be obtained by the system control processors (114).

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources (e.g., computing resources of the hardware resource set (110), external resources, other hardware resource sets of other information handling systems, etc.) to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and management may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect use of hardware devices and computing resources provided thereby. In the information handling system of FIG. 1.2, the system control processors (114) may present abstracted resources, indirection layers, virtualization layers, etc. as bare metal resources, In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

The system control processors (114), by presenting resources to the compute resource set (102), may be able to monitor the utilization of the presented resources in a manner that is transparent to the applications or other entities executing using the processors (106). Consequently, these entities may not be able to interfere with monitoring of the health of these resources. In contrast, if an agent or other entity for monitoring computing resource health is executing using the processors (106), other entities executing using the processors (106) may be able to interfere with the operation of the monitoring entity. Accordingly, embodiments of the invention may provide a method of monitoring computing resources health that is less susceptible to interference by other entities. By doing so, recomposition decisions made based on the collected information and may better reflect the actual health of resources of the composed information handling systems.

Figure 3:
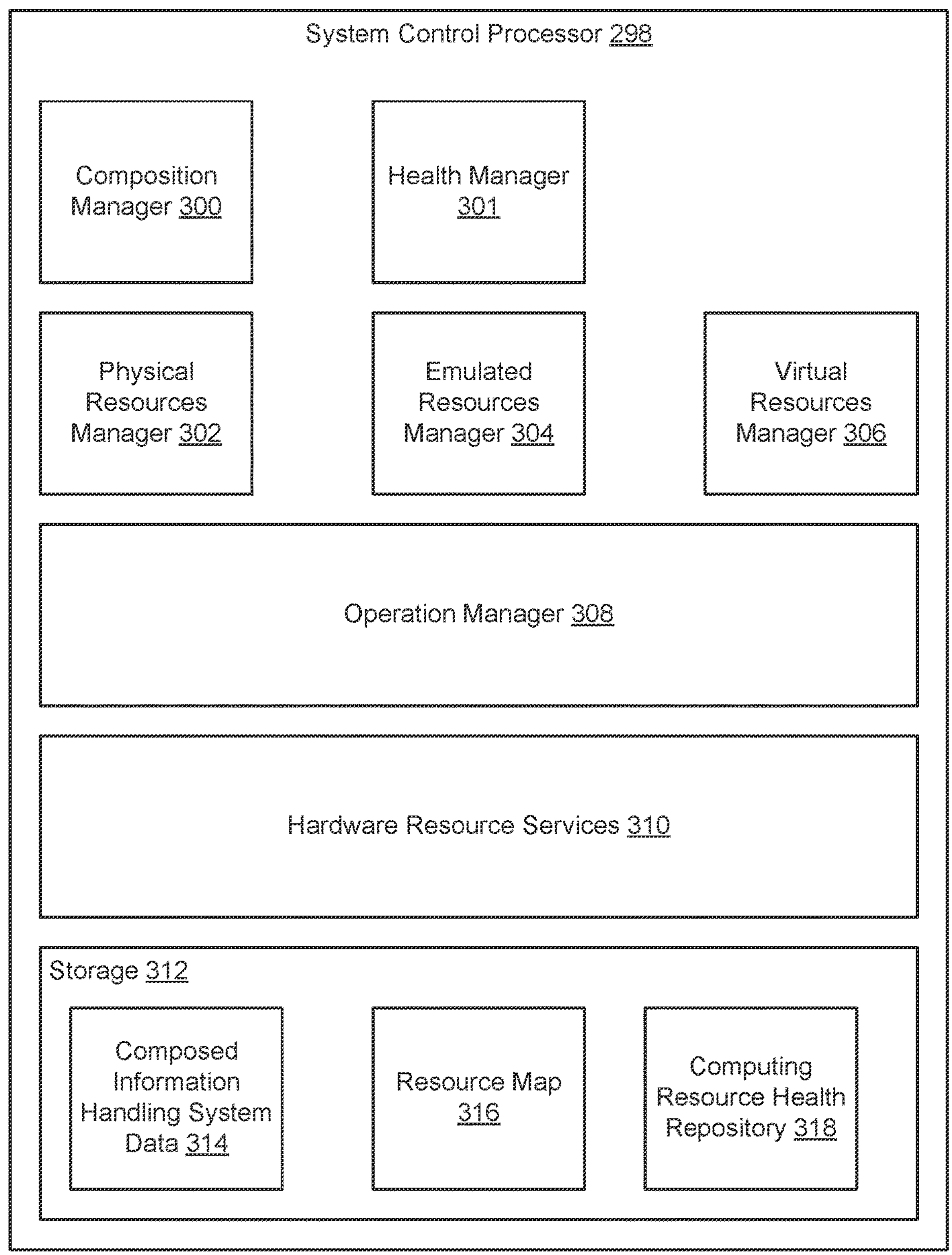
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The compute resources interface (112) may also support sideband communications between the system control processors (114), the processors (106), and/or the processor dedicated memory (104). Consequently, the system control processors (114) may be able to monitor the operations of these other devices to identify the utilization of these hardware devices by clients, identify workloads being performed by these devices, etc.

The hardware resources interface (116) may be implemented using any suitable interconnection technology including, for example, system buses such as compute express links or other interconnection protocols. The hardware resources interface (116) may support any input/output (TO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, identify health issues, recompose computing resources thereof, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-6. The information handling system (100) may be implemented using other types of computing devices without departing from the invention. For additional details regarding computing devices, refer to FIG. 8.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram the hardware resources (118) in accordance with one or more embodiments of the invention. As noted above, system control processors of information handling systems may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models, security models, workload performance availability models, reporting models, etc. For example, the system control processors may cause multiple copies of data to be redundantly stored, to be stored with error correction code, and/or other information usable for data integrity purposes.

The manner of operation of these devices may be transparent to the computing resource sets utilizing these hardware devices for providing computer implemented services. Consequently, even though the resulting composed information handling system control plane may be unaware of the implementation of these models, the composed information handling systems may still operate in accordance with these models thereby providing a unified method of managing the operation of composed information handling systems.

Further, the system control processors may monitor the health of these hardware devices. As will be discussed below, the system control processors may host applications that monitor communications indicative of health of these hardware devices and/or directly active health reporting functionality of these devices to determine whether these devices may be operating in compromised states.

While the hardware resources (118) have been illustrated and described as including a limited number of specific components, hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation, reallocation of resources to/from composed systems, and operation of composed information handling systems. By doing so, a system that includes information handling systems may dynamically instantiate and recompose (e.g., add/remove/replace resources) composed information handling systems to provide computer implemented services.

To instantiate and operate composed information handling systems, the system control processor (298) may include a composition manager (300), a health manager (301), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition/recomposition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (viii) add/remove/recompose resources presented to the compute resource sets of composed information handling systems dynamically in accordance with health states of the resources, and/or (viii) coordinate with other system control processors to provide distributed system functionalities and/or transfer performance of applications and/or computer implemented services between composed information handling systems. By providing the above functionalities, a system control processor in accordance with one or more embodiments of the invention may enable distributed resources from any number of information handling systems to be aggregated into a composed information handling system to provide computer implemented services meeting the expectations of clients.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory, storages, network interface cards, etc.). When doing so, the system control processor (298) may translate the communications into actions. The actions may be provided to the hardware devices used by the system control processor (298) to present the bare metal resources to the compute resource set(s). In turn, the hardware devices may perform the actions which result in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

In addition to instantiating composed information handling systems, the composition manager (300) may service recomposition requests from, for example, the health manager. A recomposition request may request that some of the computing resources of a composed information handling system be modified to utilize other hardware devices for providing computing resources to the composed information handling system. To service recomposition requests, the composition manager (300) may identify corresponding free resources, allocate them to a composed information handling system, and deallocate the hardware devices replaced by the free resources. Once identified, the composition manager (300) may generate and send corresponding instructions to a system control processor of the composed information handling system.

When providing its functionality, the composition manager (300) may perform all, or a portion, of the methods illustrated in FIGS. 5.1-6.

After a composed information handling system is formed, a client may begin to utilize the hardware devices of the composed information handling system by causing desired computer implemented services to be provided using the hardware devices. The health manager (301) may monitor the health of these hardware devices by the client to ascertain whether the services provided using these hardware devices meet the expectations of the client. For example, if a hardware device is likely to enter a compromised state, the computer implemented services provided by a composed information handling system may no longer be able to meet the client's expectations.

To do so, the health manager (301) may monitor the health of the hardware devices used to provide computing resources to the composed information handling system. If the health manager (301) identifies, based on its monitoring, that one or more hardware devices are likely to fail, the health manager (301) may generate and send a recomposition request to a composition manager (300). Consequently, the likely to fail hardware devices may be replaced prior to failure of the hardware devices. Accordingly, desirable computer implemented services may continue to be provided by the composed information handling system.

In one or more embodiments of the invention, the health manager (301) invokes native health reporting functionality of hardware devices when providing its functionality. By doing so, the health manager (301) may obtain information indicating the relative likelihood of the hardware devices being able to continue to supply computing resources.

In one or more embodiments of the invention, the health manager (301) utilizes intercepted bare metal communications from compute resource sets when providing its functionality. For example, when the system control processor (298) mediates presentations of resources, it may obtain bare metal communications. The health manager (301) may review the content of these communications to ascertain whether hardware devices may be likely to enter compromised states. To do so, the health manager (301) may look for duplicative requests, delays between requests and responses, and/or other indications that a hardware device may not be operating nominally. By doing so, the health manager (301) may obtain information indicating the relative likelihood of the hardware devices being able to continue to supply computing resources.

When providing its functionality, the health manager (301) may perform all, or a portion, of the methods illustrated in FIGS. 5.1-6.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system(s) allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications (e.g., to obtain address translation tables, emulation tables, etc.).

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), health manager (301), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, of the methods illustrated in FIGS. 5.1-6.

The system control processor (298) may be implemented using computing devices. The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-6. The system control processor (298) may be implemented using other types of computing devices without departing from the invention. For additional details regarding computing devices, refer to FIG. 1.1.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, any of the composition manager (300), health manager (301), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), health manager (301), physical resources manager (302), emulated resources manager (304), virtual resources manager (306), operation manager (308), and/or hardware resource services (310). The composition manager (300), health manager (301), physical resources manager (302), emulated resources manager (304), virtual resources manager (306), operation manager (308), and/or hardware resource services (310) may be implemented using other types of hardware devices without departing from the invention.

In one or more embodiments of the invention, any of the composition manager (300), health manager (301), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), health manager (301), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316), and a computing resources health repository (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The computing resource health repository (318) may be implemented using one or more data structures that includes information regarding the health of hardware devices that provide computing resources to composed information handling systems. For example, the computing resource health repository (318) may specify operation errors, health state information, temperature, and/or other types of information indicative of the health of hardware devices.

The computing resource health repository (318) may specify the health states of hardware devices via any method. For example, the computing resource health repository (318) may indicate whether, based on the aggregated health information, that the hardware devices are or are not in compromised states. A compromised health state may indicate that the corresponding hardware device has already or is likely to, in the future, be no longer able to provide the computing resources that it has previously provided. The health state determination may be made via any method based on the aggregated health information without departing from the invention.

For example, the health state determination may be made based on heuristic information regarding previously observed relationships between health information and future outcomes (e.g., current health information being predictive of whether a hardware device will be likely to provide computing resources in the future).

The computing resource health repository (318) may be maintained by, for example, the health manager (301). For example, the health manager (301) may add, remove, and/or modify information included in the computing resource health repository (318) to cause the information included in the computing resource health repository (318) to reflect the current health of the hardware devices that provide computing resources to composed information handling systems.

The data structures of the computing resource health repository (318) may be implemented using, for example, lists, tables, unstructured data, databases, etc. While illustrated in FIG. 3 as being stored locally, the computing resource health repository (318) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
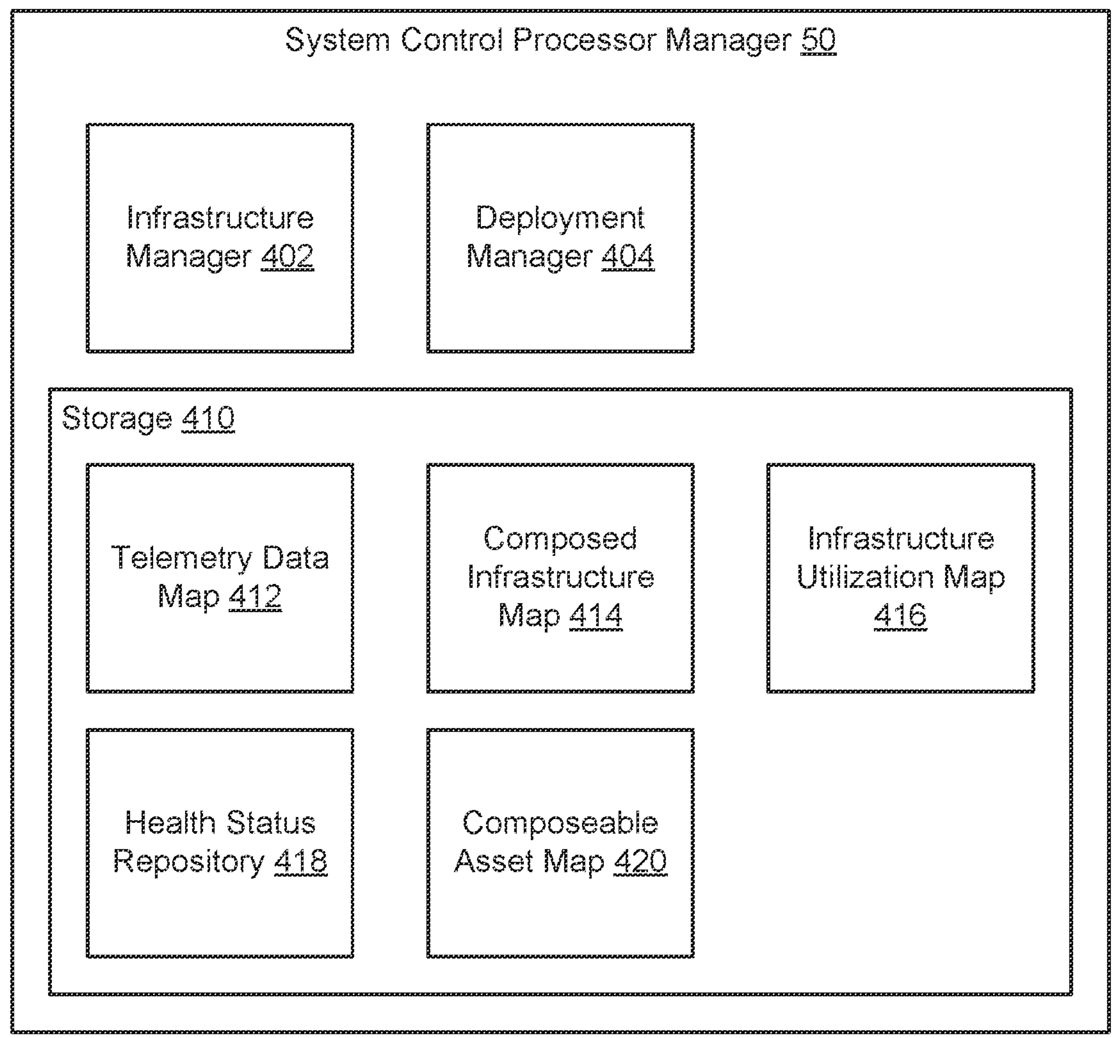
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems and recomposing composed information handling systems over time. To do so, the system control processor manager (50) may include an infrastructure manager (402), deployment manager (404), and storage (410). Each of these components is discussed below.

The infrastructure manager (402) may provide composition services. Composition services may include obtaining composition/recomposition requests for composed information handling systems, determining the resources to allocate to instantiate composed information handling systems, add/remove resources to recompose composed information handling systems, manage transfers of workloads between composed information handling systems for recomposition purposes, and cooperating with system control processors to allocate the identified resources. By doing so, the infrastructure manager (402) may cause any number of computer implemented services to be provided using the composed information handling systems.

To determine the resources to allocate to new composed information handling systems, the infrastructure manager (402) may employ an intent based model that translates an intent expressed in a composition request to one or more allocations of computing resources. For example, the infrastructure manager (402) may match an expressed intent to resources to be allocated to satisfy that intent. A lookup table may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To recompose composed information handling systems, the infrastructure manager (402) may add or remove resources from existing composed information handling systems or instantiate new composed information handling systems and transfer workloads from existing composed information handling systems to the new composed information handling systems. Consequently, the composed information handling systems performing the workloads may have different amounts and/or types of computing resources after being recomposed.

For example, to recompose a composed information handling system having a failed storage resource, the infrastructure manager may instruct a system control processor of the composed information handling system to allocate a new storage resource, transfer data from the failed storage resource to the new storage resource, and deallocate the failed storage resource. By doing so, composed information handling systems may be more likely to be able to continue to provide desired computer implemented services (as opposed to services that may be impeded due to compromised storage resources).

The infrastructure manager (402) may recompose infrastructure (e.g., deployments, individual composed information handling systems, etc.) in response to recomposition requests. The recomposition requests may be obtained from, for example, the deployment manager (404). As will be discussed in greater detail below, the deployment manager (404) may determine when and how computing resources of composed information handling systems should be recomposed.

To cooperate with the system control processors for composed information handling system composition and recomposition purposes, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition and/or recomposition requests (e.g., instantiate one or more composed information handling systems to meet the requirements of the composition requests, modify resource allocations to existing composed information handling systems, etc.).

When the infrastructure manager (402) identifies the computing resources to be allocated, the infrastructure manager (402) may communicate with any number of system control processors (e.g., of control resource sets of information handling systems) to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated and/or recomposed, the infrastructure manager (402) may add information reflecting the resources allocated to composed information handling systems, the workloads being performed by the composed information handling systems, and/or other types of information to an infrastructure utilization map (416). The infrastructure manager (402) may utilize this information to, for example, decide whether computing resources should be added to or removed from composed information handling systems (e.g., whether the computing resources are free for allocation or currently utilized by other entities). Consequently, computing resources may be dynamically re-provisioned.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-6.

The deployment manager (404) may provide recomposition services. Recomposition services may include (i) monitoring the health of computing resources of composed information handling systems, (ii) determining, based on the health of the computing resources, whether the computing resources are compromised, and/or (iii) initiating recomposition of computing resources that are compromised. By doing so, the deployment manager (404) may improve the likelihood that computer implemented services provided by composed information handling systems meet client expectations.

When providing the recomposition services, the deployment manager (404) may maintain a health status repository (418) that includes information reflecting the health of both allocated and unallocated computing resources. For example, the deployment manager (404) may update the health status repository (418) when it receives information regarding the health of various computing resources.

When providing recomposition services, the deployment manager (404) may receive recomposition requests from system control processors that have determined that at least some of the computing resources of a composed information handling system have been compromised. In such a scenario, the deployment manager (404) may elect to recompose the computing resources in response to the request or may delay recomposition to a later period of time. The deployment manager (404) may make the aforementioned determination based on whether the compromised computing resources are likely to prevent the composed information handling system from providing desired computer implemented services. If the compromised computing resources are unlikely to negatively impact the provided services, then the deployment manager (404) may delay initiating recomposition of the computing resources (e.g., by generating and sending an appropriate request to the infrastructure manager (402)).

In one or more embodiments of the invention, the deployment manager (404) is implemented using a hardware device including circuitry. The hardware device may be, for example, a digital signal processor, a field programmable gate array, or an application specific integrated circuit. The circuitry may be adapted to cause the hardware device to perform the functionality of the deployment manager (404). The deployment manager (404) may be implemented using other types of hardware devices without departing from the invention.

In one or more embodiments of the invention, the deployment manager (404) is implemented using a processor adapted to execute computing code stored on a persistent storage that when executed by the processor performs the functionality of the deployment manager (404). The processor may be a hardware processor including circuitry such as, for example, a central processing unit or a microcontroller. The processor may be other types of hardware devices for processing digital information without departing from the invention.

When providing its functionality, the deployment manager (404) may perform all, or a portion, of the methods illustrated in FIGS. 5.1-6. While illustrated and described as separate entities, the functionalities of the infrastructure manager (402) and the deployment manager (404) may be performed by a single entity (e.g., either of these entities and/or other entities) without departing from the invention.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), the composed infrastructure map (414), the infrastructure utilization map (416), the health status repository (418), and the composable asset map (420). These data structures may be maintained by, for example, the infrastructure manager (402) and/or the deployment manager (404). For example, the infrastructure manager (402) and/or deployment manager (404) may add, remove, and/or modify information included in these data structures to cause the information included in these data structures to reflect the state of any number of information handling systems, external resources, and/or composed information handling systems.

Any of these data structures may be implemented using any combination and quantity of, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIGS. 5.1-5.2 show methods that may be performed by components of the system of FIG. 1.1 to manage composed information handling systems.

FIG. 5.1 shows a flowchart of a method in accordance with one or more embodiments of the invention. The method depicted in FIG. 5.1 may be performed to manage the computing resources of a composed information handling system in accordance with one or more embodiments of the invention. The method shown in FIG. 5.1 may be performed by, for example, a health manager (e.g., 301, FIG. 3). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, health of computing resources of a composed information handling system is monitored. The computing resources may be monitored by obtaining health information regarding the hardware devices providing the computing resources.

The health of the computing resources may be monitored by intercepting bare metal communications between the hardware devices of a control resource set and the hardware devices of a hardware resource set. The bare metal communications may be analyzed to ascertain whether requests by devices of either set are being serviced by the corresponding devices of the other set. The aforementioned information may be used to infer whether any of the hardware devices of the compute resource set or hardware resource set are compromised.

The health of the computing resources may be monitored by invoking the health reporting functionality of the hardware devices of the compute resource set and/or hardware resource set. For example, a system control processor may send appropriate requests to any of these hardware devices. The hardware devices may provide, in response to the requests, health information, diagnostic reports, and/or other types of information that may be used to ascertain the state of the hardware devices.

When obtaining the health information, control plane entities may be unaware of the information collection. As noted above, system control processors may present computing devices from abstracted hardware devices as bare metal resources. Consequently, the entities present in the control plane may be unaware of the operation of the system control processor in so much as its health information collection activities.

In step 502, it is determined whether the monitoring indicates a compromised state of a device. The monitoring may indicate a compromised state when it indicates that it is likely that the device will be unlikely to provide computing resources to a composed information handling system, entirely or in part, in the future (or currently). For example, when a health reporting function is invoked, a report regarding the operational expectancy of the device may be provided. The report may indicate whether the device is likely to or already is in a compromised state.

If it is determined that the monitoring indicates a compromised state of a device, then the method may proceed to step 504. If the monitoring does not indicate that a device is in a compromised state, then the method may end following step 502.

In step 504, the computing resources are marked for recomposition. The computing resources may be marked via any method without departing from the invention. For example, the computing resources may be marked by adding an identifier of the computing resources to a list that specifies computing resources that are to be recomposed in the future. In another example, the computing resources may be marked for recomposition by sending an appropriate recomposition request to a deployment manager of a system control processor manager.

The method may end following step 504.

Using the method illustrated in FIG. 5.1, computing resources of a composed information handling system may be managed in a manner that is transparent to control plane entities. By doing so, computing resources that are likely to negatively impact the ability of the composed information handling system to provide computer implemented services in the future may be proactively remediated. Consequently, a composed information handling system may be more likely to provide desired computer implemented services.

Turning to FIG. 5.2, FIG. 5.2 shows a flowchart of a method in accordance with one or more embodiments of the invention. The method depicted in FIG. 5.2 may be performed to restart a composed information handling system in accordance with one or more embodiments of the invention. The method shown in FIG. 5.2 may be performed by, for example, a health manager (e.g., 301, FIG. 3). Other components of the system in FIG. 1.1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, the start of a composed information handling system restart is identified. The restart may be identified based on communications between various hardware devices of the system. For example, the composed information handling system may perform a graceful shutdown in advance of a restart. Consequently, various communications may be sent to prepare the various hardware devices of the composed information handling system prior to restart.

The restart may be signaled by, for example, the composed information handling system power cycling and initiating a startup procedure.

In step 512, it is determined whether any computing resources are marked for recomposition. The determination may be made based on, for example, the list discussed with respect to step 504 of FIG. 5.1. As previously discussed, the list may include identification information of computing devices in compromised states. If any computing resources are specified in the list, then it may be determined that at least one of the computing resources is marked for recomposition.

If any computing resources are marked for recomposition, then the method may proceed to step 514. Otherwise, the method may end following step 512.

In step 514, the restart is paused. The restart may be paused prior to hardware device discovery being performed as part of the restart process. Consequently, at step 514 and through step 520, the composed information handling system may not have yet identified all of the hardware devices that will contribute computing resources to it.

In step 516, recomposition of the computing resources is requested. The recomposition may be requested by sending an appropriate message to an infrastructure manager. The infrastructure manager may, in turn, generate and send instructions to a system control process of the composed information handling system that manages the computing resources. The instructions may cause the system control processor to deallocate the computing resources (e.g., release them) and allocate other free computing resources (e.g., secure them) to replace the deallocated computing resources.

In step 518, a response regarding the recomposition request is received. The response may indicate that either (i) the computing resources have been recomposed, (ii) the computing resources cannot be recomposed (e.g., no available free computing resources to replace them), or (iii) the computing resources will be recomposed at a later point in time (e.g., delayed). The response may be received from the infrastructure manager.

In step 520, the restart is resumed after steps 514-518 are performed. Resuming the restart may, for example, cause the composed information handling system to go through a hardware device discovery process. Consequently, any computing resources provided by hardware devices allocated to the composed information handling system by virtue of steps 516 and 518 may be discovered by the composed information handling system.

The method may end following step 520.

Using the method illustrated in FIG. 5.2, a system in accordance with embodiments of the invention may automatically and/or transparently recompose computing resources that have been compromised. The resources may be recomposed as part of a restart (e.g., boot) of the composed information handling system.

Figure 6:
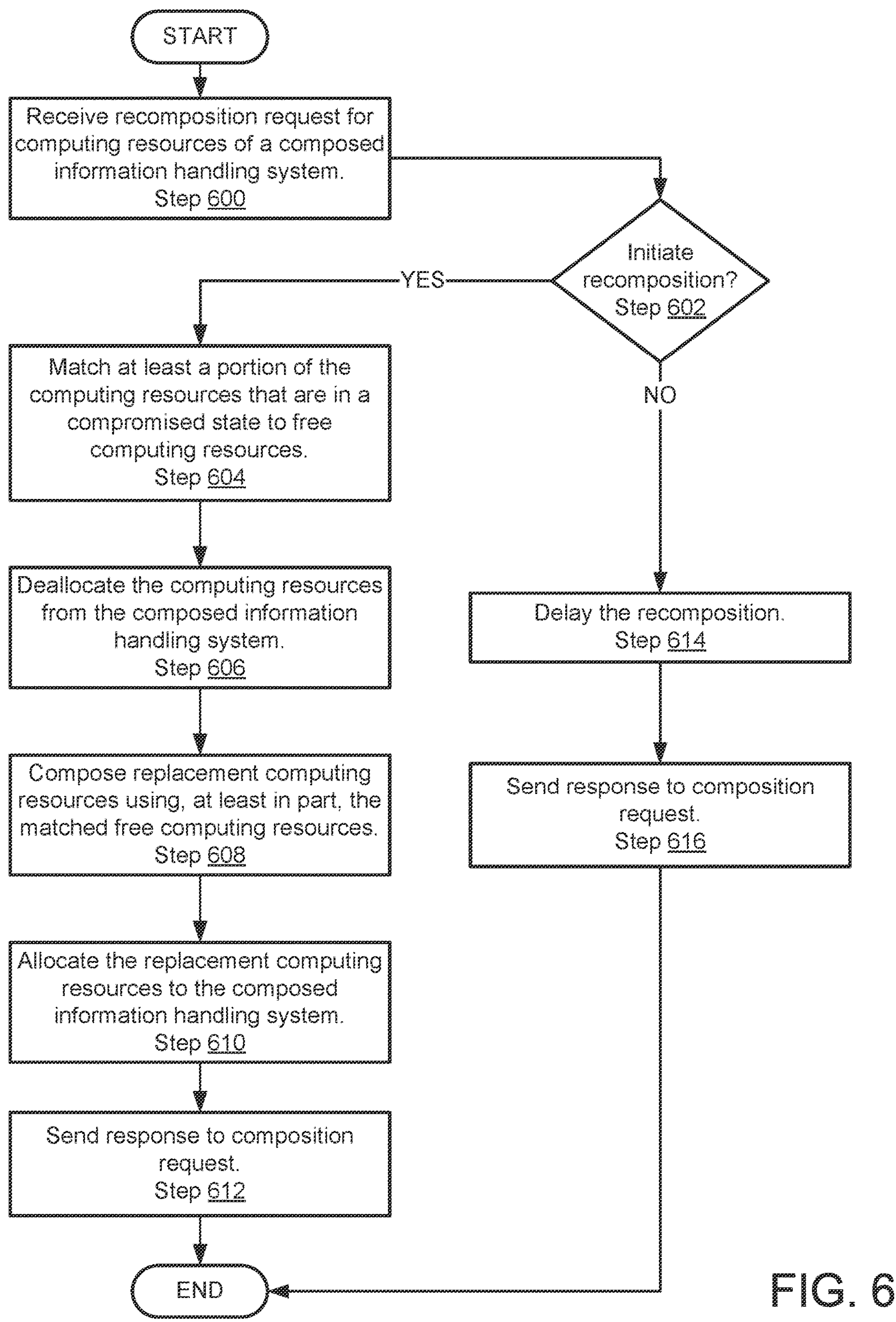
FIG. 6 shows a flowchart of a method of recomposing computing resources of a composed information handling system in accordance with one or more embodiments of the invention.

As discussed above, system control processor managers may service recomposition requests for computing resources. Turning to FIG. 6, FIG. 6 shows a flowchart of a method in accordance with one or more embodiments of the invention. The method depicted in FIG. 6 may be performed to service recomposition requests in accordance with one or more embodiments of the invention. The method shown in FIG. 5.3 may be performed by, for example, a system control processor manager (e.g., 50, FIG. 1.1). Other components of the system in FIG. 1.1 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, a recomposition request for computing resources of a composed information handling system is received. The recomposition request may be obtained from a system control processor of the composed information handling system.

In step 602, it is determined whether to initiate recomposition of the computing resources. The determination may be made based on whether the composed information handling system is likely to be able to continue to provide computer implemented services even though the computing resources may be compromised. If it is likely that that composed information handling system will be unlikely to be able to continue to provide computer implemented services, then initiating recomposition of the computing resources may be determined.

If it is determined that recomposition of the computing resources should be initiated, then the method may proceed to step 604. Otherwise, the method may proceed to step 614 following step 602.

In step 604, at least a portion of the computing resources that are in a compromised state are matched to free computing resources. The match may be performed using, for example, a telemetry data map (412, FIG. 4), composed infrastructure map (414, FIG. 4), infrastructure utilization map (416, FIG. 4), and/or a health status repository (418, FIG. 4).

For example, a hardware device that is both free and that may be able to provide the type of computing resources may be identified using the aforementioned data structures. The hardware device may be hosted by an information handling system and/or may be an external resource.

In step 606, the computing resources are deallocated from the composed information handling system. The computing resources may be deallocated by generating and sending deallocation instructions to a system control processor of the composed information handling system. The system control processor may deallocate the computing resources in response to the instructions.

For example, the system control processor may migrate data stored in the computing resources, workloads being performed using the computing resources, etc. to other computing resources. Once migrated, the hardware device(s) providing the computing resource may be released.

In step 608, replacement computing resources are composed using, at least in part, the matched free computing resources. The replacement computing resources may be composed by generating and sending allocation instructions to the system control processor of the composed information handling system. The system control processor may allocate the matched free computing resources in response to the allocation instructions. Additionally, the system control processor may setup management services for the matched free computing resources and/or migrate the workloads/data migrated in step 606 to the matched free computing resources.

In step 610, the replacement computing resources are allocated to the composed information handling system. The replacement computing resources may be allocated by updating appropriate data structures to indicate that the matched free computing resources are no longer free for allocation purposes.

Additionally, to allocate the replacement computing resources, the system control processor may begin presentation of the replacement computing resources to the composed information handling system as bare metal resources. Consequently, when the control plane of the composed information handling system identifies the presented resources, the control plane may interact with them as bare metal resources rather than managed resources (e.g., abstracted, virtualized, managed in accordance with a data integrity model such as redundant storage of data or error correction encoding of it, etc.).

Thus, via steps 604-610, while the restart of a composed information handling system is paused and after requesting recomposition of the computing resources has been requested, the system control processor may, in response to instructions from a system control manager, may release the computing resources (e.g., based on a decomposition request from the system control processor manager); receive an allocation request for a new computing resource; prepare the new computing resource for presentation as a bare metal resource based on the allocation request (e.g., from the system control processor manager); and present the new computing resource as a bare metal resource to at least one processor of the composed information handling system.

In step 612, a response to the composition request is sent. The response may be sent to the system control processor of the composed information handling system. The response may indicate that the computing resources have been recomposed.

For example, by sending the response to the system control processors of composed information handling systems, the composed information handling systems may be notified that one of the computing resources have been deallocated from the composed information handling system. Similarly, the response further indicates that new computing resources have been allocated to the composed information handling system to replace the at least the portion of the at least one of the computing resources.

The method may end following step 612.

Returning to step 602, the method may proceed to step 614 when recomposition is not initiated.

In step 614, the recomposition is delayed. The recomposition may be delayed until, for example, other computing resources of the composed information handling system become compromised that will negatively impact the computer implemented services provided by the composed information handling system.

The recomposition may be delayed to another period of time without departing from the invention. For example, the composition may be delayed until a workload on the system control processor manager is reduced (e.g., from being overloaded or otherwise having insufficient resources for recomposing the computing resources).

In step 616, a response to the composition request is sent. The response may indicate that the computing resources have not been recomposed. The response may also indicate that the composed information handling system should return to normal operation (e.g., complete its restart procedure). The response may also indicate when the computing resources are likely to be recomposed in the future (e.g., so that the composed information handling system may perform a graceful restart in the future).

For example, by sending the response, the system control processors may be notified that the recomposition of the computing resources will be delayed into the future.

The method may end following step 616.

Using the method illustrated in FIG. 6, a system in accordance with embodiments of the invention may recompose computing resources for an information handling system.

Figure 7:
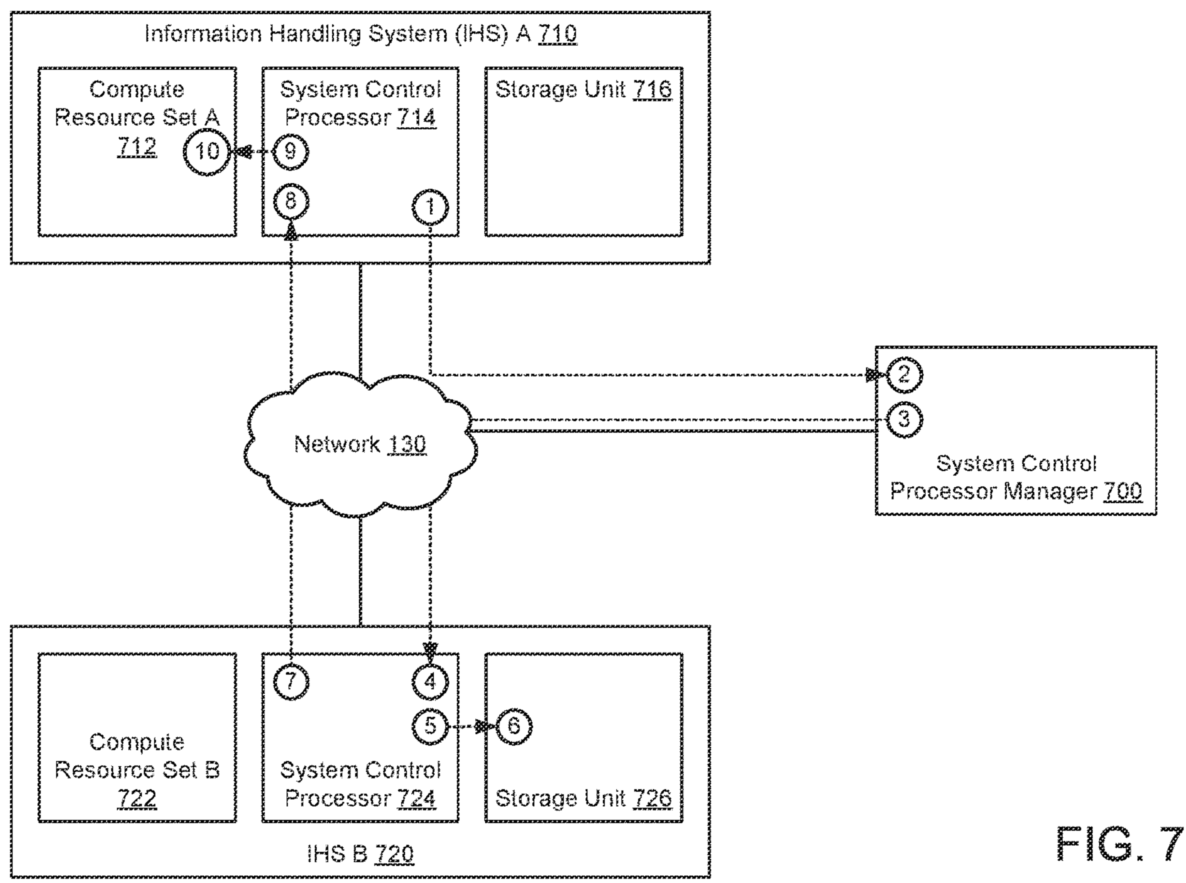
FIG. 7 shows a diagram of the operation of an example system over time in accordance with one or more embodiments of the invention.

To further clarify embodiments of the invention, a non-limiting example is provided in FIG. 7. FIG. 7 shows a system similar to that illustrated in FIG. 1.1. Actions performed by components of the system are illustrated by numbered, circular boxes interconnected, in part, using dashed lines terminating in arrows. For the sake of brevity, only a limited number of components of the system of FIG. 1.1 is illustrated in FIG. 7.

Example

Consider a scenario as illustrated in FIG. 7 in which a system control processor manager (700) has instantiated a composed information handling system for a client. The composed information handling system utilizes a compute resource set A (712), a system control processor (714), and a storage unit (716) of an information handling system A (710). Consequently, the computing resources (e.g., 722, 724, 726) of information handling system B (720) are free.

A client that requested instantiation of the composed information handling system utilizes the composed information handling system to run a database application. Consequently, the compute resource set A (712) sends numerous bare metal communications to the system control processor (714) to have data stored in the storage unit (716). Due to the high usage of the storage unit (716), the storage unit (716) begins to lose storage capacity due to partial failure of its storage cells.

As the storage unit (716) begins to fail, the system control processor (714), in step 1, monitors the health of the storage unit (716) and determines that the storage resources provided by the storage unit (716) have become compromised due to the likely future failure of the storage unit (716). In response, at step 2, the system control processor (714) sends a recomposition request for the storage resources to the system control processor manager (700).

In response, at step 3, the system control processor manager (700) determines that failure of the storage resources is likely to impair the ability of the composed information handling system to provide computer implemented services. Accordingly, the system control processor manager (700) identifies that the storage unit (726) of the information handling system B (720) may be used to replace the computing resources contributed by the storage unit (716) of information handling system A (710). Based on the identification, the system control processor manager (700) generates and sends instructions to the system control processor (724), at step 4, to prepare and present the storage unit (726) to the composed information handling system.

In response, the system control processor (724), at step 5, sets up management services for the storage unit (726). At step 6, the system control processor (724) allocates the storage resources of the storage unit (726) for allocation to the composed information handling system.

At step 7, the system control processor (724) establishes a connection with the system control processor (714). At step 8, the system control processor (724) notifies the system control processor (714) of the storage resources.

In response, at step 8, the system control processor (714) transfers the data stored in storage unit (716) to storage unit (726) by way of system control processor (724). Once transferred, the system control processor (714) presents the storage resources of the storage unit (726) to the compute resource set A (712) as bare metal resources. Consequently, at step 10, the compute resource set A (712) discovers the storage resources and begins to use them without being aware that the storage resources are being provided by a different storage device (prior to recomposition).

The system control processor (714) may also deallocate the storage unit (716) thereby releasing it.

End of Example

Thus, as illustrated in FIG. 7, embodiments of the invention may provide for the recomposition of computing resources.

Figure 8:
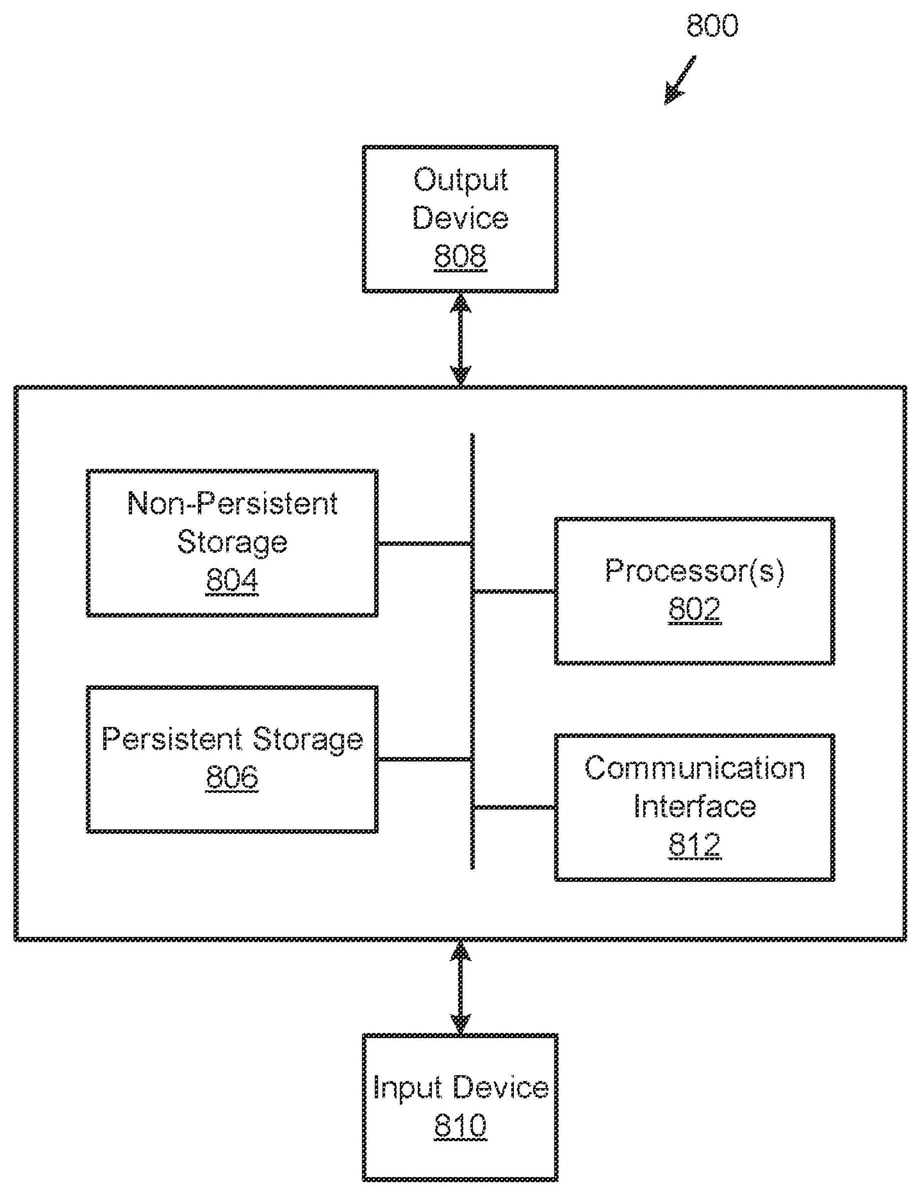
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth® interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system and method for dynamically instantiating and recomposing composed information handling systems. Specifically, embodiments of the invention may provide for health monitoring of computing resources of a composed information handling systems. If the monitoring indicates that the computing resources have been compromised, the computing resources may be automatically recomposed to transition them from a compromised to a nominal state of operation. Consequently, computer implemented services may not be negatively impacted by the compromised state of the computing resources.

Thus, embodiments of the invention may address the problem of limited computing resources in a distributed system. For example, by recomposing computing resources, composed information handling system may not need to be over-provisioned with computing resources to address potential compromises of the computing resources. Accordingly, it may be more likely that desired computer implemented services are provided at reduced levels of allocated computing resources. Thus, embodiments of the invention may more efficiently marshal limited computing resources to provide desired services.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. An information handling system (IHS) for composing composed IHSs, comprising:

persistent storage; and a system control processor programmed to:

after being allocated to a composed IHS of the composed IHSs:

monitor health of computing resources of the composed IHS, wherein the computing resources comprise physical memory and physical graphics processors;

make a determination, based on the monitoring of the health of the computing resources, that at least one of the computing resources is in a compromised state;

based on the determination, mark the at least one of the computing resources for recomposition;

identify, at a later point in time and after the determination, a restart of the composed IHS;

after identifying the restart, make a second determination that the at least one of the computing resources is marked for recomposition;

based on the second determination:

pause the restart;

while the restart is paused:

receive a decomposition request for the at least one of the computing resources;

deallocate the at least one of the computing resources that is marked for recomposition from the composed IHS, wherein the deallocation of the at least one of the computing resources is based on the decomposition request;

prepare new computing resources for presentation as bare metal resources;

allocate the new computing resources to the composed IHS to replace the at least one of the computing resources that is marked for recomposition;

resume the restart after allocating the new computing resources; and provide computer implemented services to a client using the composed IHS that comprises the new computing resources.

2. The IHS of claim 1, wherein the system control processor is further programmed to:

while the restart is paused and after requesting recomposition of the at least one of the computing resources:

delay replacement of the at least one of the computing resources that is marked for recomposition.

3. The IHS of claim 1, wherein the system control processor is further programmed to:

while the restart is paused:

receive an allocation request for a new computing resource; and present, in response to the allocation request, the new computing resource as a bare metal resource to at least one processor of the composed IHS.

4. The IHS of claim 1, preparing the new computing resources for presentation comprises:

generating at least one abstraction layer for the new computing resources; and setting up management services for the new computing resources based on at least one management model.

5. The IHS of claim 1, wherein the composed IHS comprises a compute resource set, a hardware resource set, and a control resource set comprising the system control processor.

6. The IHS of claim 5, wherein the control resource set presents abstracted computing resources of the hardware resource set as bare metal resources to the compute resource set.

7. The IHS of claim 6, wherein the system control processor monitors the health of the computing resources based on intercepted bare metal communications between the compute resource set and the hardware resource set.

8. The IHS of claim 6, wherein the system control processor monitors the health of the computing resources based on health reporting functionality of hardware devices of the hardware resource set.

9. An information handling system (IHS) for composing composed IHSs, comprising:

persistent storage; and a system control processor programmed to:

obtain a composition request for a composed IHS of the composed IHSs, wherein the composition request is an intent based request initiated by a user based on a compute resource set of a first IHS, a control resource set of a second IHS, and a hardware resource set of a third IHS, wherein the first IHS, the second IHS, and the third IHS are distinct devices operably connected to each other over a network, wherein the control resource set of the second IHS manages the hardware resource set of the third IHS and the compute resource set of the first IHS, and presents the hardware resource set to the compute resource set as bare metal resources to instantiate the composed IHS, wherein the intent based request specifies a set of predetermined characteristics that the user wants to have in the composed IHS without specifying a method of management, types and quantities of computing resources to be allocated to the composed IHS, wherein, based on a lookup table, the system control processor converts the intent based request into required computing resources, wherein the required computing resources specify the method of management, the types, and the quantities of computing resources to be allocated to the composed IHS to satisfy the set of predetermined characteristics;

allocate the required computing resources to instantiate the composed IHS;

after being allocated to the composed IHS:

monitor health of the required computing resources of the composed IHS, wherein the required computing resources comprise physical memory and physical graphics processors;

make a determination, based on the monitoring of the health of the required computing resources, that at least one of the required computing resources is in a compromised state;

based on the determination, mark the at least one of the required computing resources for recomposition;

identify, at a later point in time and after the determination, a restart of the composed IHS;

after identifying the restart, make a second determination that the at least one of the required computing resources is marked for recomposition;

based on the second determination:

pause the restart;

while the restart is paused:

deallocate the at least one of the required computing resources that is marked for recomposition from the composed IHS;

prepare new computing resources for presentation as bare metal resources, wherein preparing the new computing resources comprises:

generating at least one abstraction layer for the new computing resources; and setting up management services for the new computing resources based on at least one management model;

allocate the new computing resources to the composed IHS to replace the at least one of the computing resources that is marked for recomposition;

resume the restart after allocating the new computing resources; and provide computer implemented services to a client using the composed IHS that comprises the new computing resources.

10. The IHS of claim 9, wherein the system control processor is further programmed to:

while the restart is paused and after requesting recomposition of the at least one of the computing resources:

delay replacement of the at least one of the required computing resources that is marked for recomposition.

11. The IHS of claim 9, wherein the composed IHS comprises a second compute resource set, a second hardware resource set, and a second control resource set comprising a second system control processor.

12. The IHS of claim 9, wherein the control resource set of the second IHS presents abstracted computing resources of the hardware resource set of the third IHS as the bare metal resources to the compute resource set of the first IHS.

13. The IHS of claim 12, wherein the system control processor monitors the health of the required computing resources based on intercepted bare metal communications between the compute resource set of the first IHS and the hardware resource set of the third IHS.

14. The IHS of claim 12, wherein the system control processor monitors the health of the required computing resources based on health reporting functionality of hardware devices of the hardware resource set of the third IHS.

* * * * *